US006667595B2

(12) United States Patent
Wiseman

(10) Patent No.: US 6,667,595 B2
(45) Date of Patent: Dec. 23, 2003

(54) STALL DETECTION IN STEPPER MOTORS

(75) Inventor: Martin Graham Wiseman, Milton (GB)

(73) Assignee: Dresser, Inc., Addison, TX (US)

( * ) Notice: Subject to any disclaimer, the term of this patent is extended or adjusted under 35 U.S.C. 154(b) by 39 days.

(21) Appl. No.: 10/078,886

(22) Filed: Feb. 19, 2002

(65) Prior Publication Data

US 2003/0155883 A1 Aug. 21, 2003

(51) Int. Cl.⁷ .................................................. H02P 8/34
(52) U.S. Cl. ........................................................ 318/696
(58) Field of Search ................................. 318/685, 696, 318/565, 430, 431, 434

(56) References Cited

U.S. PATENT DOCUMENTS

| 4,609,868 | A | * | 9/1986 | Ferrari | |
|---|---|---|---|---|---|
| 4,791,343 | A | * | 12/1988 | Ahrendt | 318/696 |
| 4,851,755 | A | * | 7/1989 | Fincher | 318/696 |
| 6,014,000 | A | * | 1/2000 | Gutierrez | 318/696 |

* cited by examiner

Primary Examiner—Bentsu Ro
(74) Attorney, Agent, or Firm—Fish & Richardson P.C.

(57) ABSTRACT

A stall detection method and system for a stepper motor ascertains a stalled condition according to current rise time of the windings. The motor is determined to be in a normal running condition when current rise time of opposed windings is substantially constant, including monotonic increases and monotonic decreases, in cycles of the rotor. The motor is determined to be in a stalled condition when the current rise time of opposed windings has a relative short-long pattern.

14 Claims, 2 Drawing Sheets

STALL DETECTION IN STEPPER MOTORS

BACKGROUND OF THE INVENTION

1. Technical Field of the Invention

The invention relates to stepper motors, including those used in large industrial internal combustion engines, and more particularly to a method and system for economically determining when the stepper motor does not move in response to a command signal.

2. Description of Related Art

Stepper motors are known in the prior art and have many uses, including in large industrial internal combustion engines for performing some control function such as controlling the regulator position. The latter application typically involves an actuator member sometimes called a "hockey puck". The "hockey puck" is axially movable along a threaded shaft that is rotationally driven by the stepper motor.

A stepper motor is a synchronous motor having a magnetized rotor and a plurality of stator windings, typically four, energized in a designated sequence to make the rotor rotate. Normally, the rotor remains synchronized to the windings as they are energized (in synchronism), so that the rotor's position is known precisely. However, if the torque load on the rotor output shaft becomes too great, or the motor is accelerated too fast, it is possible for the motor to stall. In the stalled condition, the rotor no longer moves synchronously and may become stationary. There is no in-between state. In other words, the motor is either running in synchronism or it is stalled.

A problem with stepper motors is that it is difficult to determine, without physical inspection, whether the rotor actually moved in response to a command signal energizing the windings. One solution known in the prior art is to install an encoder on the motor, for example a linear variable differential transformer (LVDT), or rotary position encoder. This may be objectionable in numerous applications because of cost.

Therefore, there is a need for a simple and inexpensive manner in which to determine whether a stepper motor is stalled.

SUMMARY OF THE INVENTION

The present invention provides an economical method and system for detection of stall in a stepper motors.

The invention embodies a stall detection method for a stepper motor having a rotor and a plurality of energizable stator windings. A stalled condition of the motor is ascertained according to current rise time of the windings. The stator windings are arranged in opposed pairs and the stepper motor is determined to be stalled when the current rise time of one winding in an opposed winding pair is different from the other winding in the opposed winding pair within a cycle of the motor. The stepper motor is determined to be running when the current rise time of all of the windings is substantially equal within a cycle of the motor.

The invention further embodies a stall detection system for a stepper motor having a rotor and a plurality of energizable windings. The system includes a device that ascertains a running condition of the motor when the current rise times of all the windings in the motor are substantially equal within a cycle of the motor and a stalled condition of the motor when the current rise times of one winding is relatively short as compared to a winding opposite the one winding within a cycle of the motor.

DETAILED DESCRIPTION OF THE EXEMPLARY EMBODIMENTS OF THE INVENTION

Figure 1:
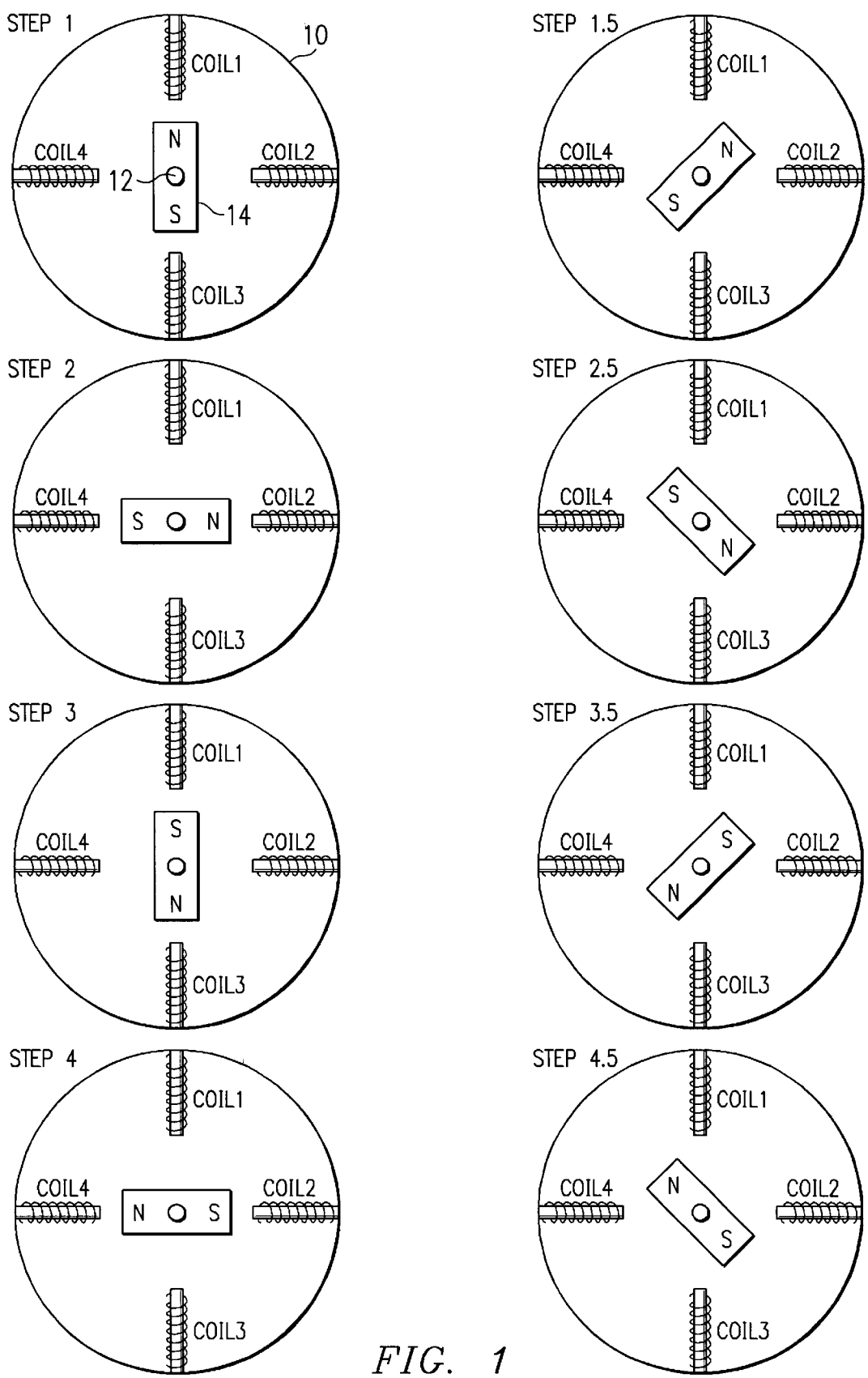
FIG. 1 is a simplified schematic illustration of a stepper motor and sequentially shows various positions of the rotor.

FIG. 1 shows an exemplary stepper motor 10 having a rotary shaft 12 with a magnetized rotor 14 mounted thereto and driven by a plurality of stator windings (i.e. coils), typically four, as shown by diametrically opposite coils 1 and 3 offset from opposite coils 2 and 4. FIG. 1 shows rotation of rotor 14 upon sequential energization of the coils causing the rotor to rotate from step 1 to step 1.5 to step 2 to step 2.5 to step 3 to step 3.5 to step 4 to step 4.5, and so on. For convenience of discussion, a cycle of the stepper motor 10 is used herein to mean a sequential energization of each of the coil windings in the motor. A cycle does not necessarily need to be measured beginning at coil 1 and ending at coil 4, but can be measured beginning at any coil, for example beginning at coil 2 and ending at coil 1 or beginning at coil 4 and ending at coil 3. Also, a stalled condition does not necessarily indicate that the motor 10 is stationary, but rather that the rotor 14 is not moving in synchronism. It is to be understood that the present invention also applies to stepper motors having fewer than or greater than 4 coil windings.

The present detection method utilizes the observed fact that the inductance of the windings varies with the position of the rotor 14. When voltage is applied to a winding, the current builds up at a rate determined by the applied voltage, back EMF, and winding inductance. The back EMF varies with motor speed and load, while the inductance varies with the position of the rotor 14 relative to the winding. When the motor 10 is in a normal running condition, the rate of current rise in all of the coil windings, include coil windings opposed diametrically in the motor 10, is substantially equal within a given cycle of the motor 10. Although the absolute value of the rate of current rise will vary with voltage, speed and load from cycle to cycle, the ratio of the current rise time from one coil to another coil winding within a given cycle typically remains within a few percent, e.g. less than 5%.

When the motor is in a stalled condition, the rate of current rise for opposed coil windings will show a large variation within a given cycle. Typically, the largest value is about 1.2 to 1.4 times the smallest value. The reason for this difference is that rotor 14 is not synchronized with the sequential energization of the coil windings. In other words, the rotor 14 is not in synchronism. When the rotor is moving in synchronism, the rotor magnet is in a similar position relative to each coil winding when the current is switched on, and hence the inductance of each winding is similar. On the other hand, when the rotor is not moving in synchronism, the rotor magnet will be oriented differently with respect to each coil winding as the winding is energized. This causes large differences in the winding inductance, and hence in current rise time. If, for example, the rotor 14 is stalled (in a cycle of the motor) with north pole near coil 1, the current rise time of coils 1 and 3 will be different, because each is nearest a different pole of the rotor magnet. The current rise time of coils 2 and 4 will be similar, because the poles of the rotor magnet are displaced substantially equally from these coil windings.

Figure 2:
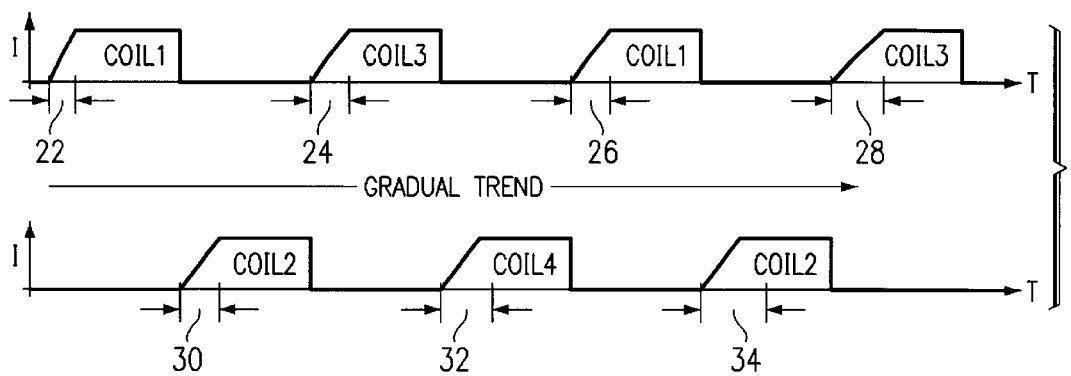
FIG. 2 is an idealized coil current waveform diagram showing normal operation of the stepper motor.

The present method involves ascertaining the noted stalled condition of the motor 10 according to current rise time of the windings. The system of this invention includes a device constructed to operate in accordance with the method. The motor 10 is determined to be in a normal running condition when the current rise time of opposed coil windings is substantially equal within a cycle of the motor 10 or over multiple cycles of the motor 10. This is illustrated in FIG. 2 showing current waveforms in normal operation. The current rise times for coil 1, then coil 3, then coil 1, then coil 3, etc. are shown at 22, 24, 26, 28, respectively, and the current rise times for coil 2, then coil 4, then coil 2, the coil 4, etc. are shown at 30, 32, 34, respectively. The substantially constant current rise time can include gradual increases and decreases, e.g. less than 5% within a cycle, and gradual monotonic increases, and gradual monotonic decreases, over a plurality of cycles. FIG. 2 illustrates the current rise time gradually monotonically increasing. There may also be a gradual monotonic decrease of current rise time. This is normal operation of a stepper motor.

Figure 3:
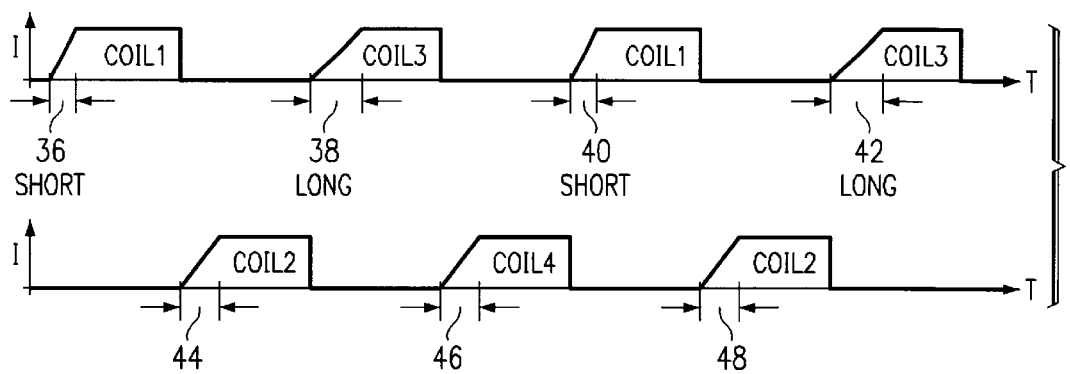
FIG. 3 is an idealized coil current waveform showing the stalled condition of the stepper motor.

A stalled condition of the motor 10 is determined when the current rise time of opposed windings measured in a given cycle of the motor 10 has a relative short-long pattern. If the motor 10 is stalled for more than a single cycle, the short-long pattern will repeat for multiple cycles. This is illustrated in FIG. 3 at short current rise time 36, then long current rise time 38, and again at short current rise time 40, then long current rise time 42. FIG. 3 illustrates the current rise times of the stepper motor 10 stalled with the north pole of the rotor 14 substantially aligned with coil 1. In contrast to the substantially constant current rise times of opposed coils in FIG. 2, including gradual monotonic increases, and gradual monotonic decreases, the current rise times in FIG. 3 of opposed coils decrease then increase then decrease then increase, etc., in a repetitive pattern of alternating short-long-short-long over a plurality of cycles. During the stalled condition as shown in FIG. 3, the current rise time 36 for coil 1, then 38 for coil 3, then 40 for coil 1, then 42 for coil 3, etc., decreases then increases then increases then decreases then increases, etc., providing a plurality of short and long interdigitated current rise times for coils 1 and 3, respectively. In FIG. 3, the current rise time 44 for coil 2, then 46 for coil 4, then 48 for coil 2, etc., is substantially constant. Depending on the position of the rotor, the relative current rise times of coils 1 and 3 and coils 2 and 4 may be reversed, such that coils 2 and 4 have the noted short and long interdigitated rise times. The ratio of the long current rise time to the short current rise time within a single cycle is at least about 1.2:1, and typically in the range of about 1.2:1 to 1.4:1. Also, the position of the rotor 14 can be determined by determining which pair of opposed coils exhibit the short-long pattern. Thus, if stalled with the north/south poles substantially at coils 1 and 3, coils 1 and 3 will exhibit the short-long pattern. If stalled with the north/south poles substantially at coils 2 and 4, coils 2 and 4 will exhibit the short-long pattern.

Figure 4:
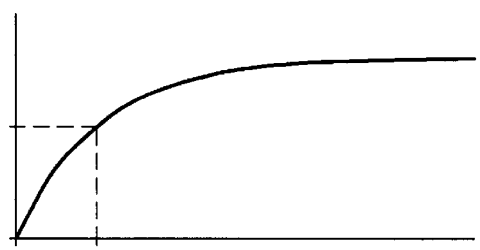
FIG. 4 is a typical motor current waveform diagram showing where to detect the current rise time when resistive current limiting is used.
Figure 5:
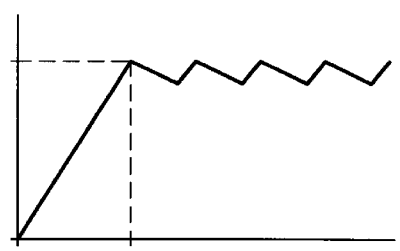
FIG. 5 is a typical motor current waveform diagram showing where to detect the current rise time when pulse width modulation (PWM) current limiting is used.

The detection method may be used with resistive current limiting energization of the motor, FIG. 4, and with PWM, pulse width modulation, current limiting energization of the motor, FIG. 5. In PWM current limiting energization, the current rise time is preferably measured from the application of current to the time that the coil reaches peak current. In resistive current limiting energization, the current rise time can be measured from the time of application of current to the time that the coil reaches given current value. The given current value is preferably chosen to occur while the current rise rate is high (i.e. on the steep portion of the current over time curve). Also, the motor may be energized through full bridge drivers or half bridge drivers.

Although one embodiment of the method and system have been illustrated in the accompanying drawings and described in the foregoing description, it will be understood that the invention is not limited to the embodiment disclosed, but is capable of numerous rearrangements, modifications and substations without departing from the spirit and scope of the invention as defined in the following claims.

I claim:

1. A method for detecting whether a stepper motor is running or stalled, the stepper motor having a rotor and a plurality of energizable stator windings, the method comprising:

determining that the stepper motor is stalled based on a current rise time of the windings wherein the stator windings are arranged in opposed pairs; and wherein the stepper motor is determined to be stalled when the current rise time of opposed windings is a relative short-long repetitive pattern over more than one cycle of the motor.

2. The method according to claim 1 further comprising:

determining that the motor is running when the current rise time of all of the windings is substantially equal within a cycle of the motor.

3. The method according to claim 2 wherein the substantially equal current rise time includes gradual increases and decreases of less than approximately 5% within a cycle of the motor.

4. The method according to claim 2 wherein the substantially equal current rise time includes gradual monotonic increases, and gradual monotonic decreases, over a plurality of cycles of the motor.

5. The method according to claim 1 wherein the repetitive pattern alternates between increased and decreased current rise times.

6. The method according to claim 1 wherein the ratio of the long current rise time to the short current rise time within a single cycle of energization of the windings is at least about 1.2:1.

7. The method according to claim 6 wherein the ratio is in the range of about 1.2:1 to 1.4:1.

8. The method according to claim 1 wherein the ratio of the long current rise time to the next short current rise time is at least about 1.2:1.

9. The method according to claim 8 wherein the ratio is in the range of about 1.2:1 to 1.4:1.

10. A stall detection system for a stepper motor, the stepper motor having a rotor and a plurality of energizable windings, the system comprising a device that ascertains a running condition of the motor when the current rise times of all the windings in the motor are substantially equal within a cycle of the motor and a stalled condition of the motor when the current rise times of one winding is relatively short as compared to a winding opposite the one winding within a cycle of the motor and wherein the stalled condition of the motor is detected when the current rise times of the one winding and the winding opposite the one winding exhibit a pattern of relative short-long over more than one cycle of the motor.

11. The system according to claim 10 wherein the system ascertains that the motor is in the stalled condition when the ratio of the long current rise time to the short current rise time within a single cycle of energization of the winding is at least about 1.2:1.

12. The system according to claim 11 wherein the ratio is in the range of about 1.2:1 to 1.4:1.

13. The system according to claim 10 wherein the ratio of the long current rise time to the next short current rise time is at least about 1.2:1.

14. The system according to claim 13 wherein the ratio is in the range of about 1.2:1 to 1.4:1.

* * * * *